US008725084B2

(12) United States Patent
Lou et al.

(10) Patent No.: US 8,725,084 B2
(45) Date of Patent: May 13, 2014

(54) MIMO MODE SWITCH MANAGEMENT FOR BEAMFORMED MIMO SYSTEMS

(75) Inventors: Hanqing Lou, Plano, TX (US); Li Guo, Allen, TX (US); Genyuan Wang, Plano, TX (US); Hang Jin, Plano, TX (US); Yanxin Na, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 729 days.

(21) Appl. No.: 12/623,932

(22) Filed: Nov. 23, 2009

(65) Prior Publication Data

US 2011/0124290 A1      May 26, 2011

(51) Int. Cl.
*H04B 7/00*      (2006.01)

(52) U.S. Cl.
USPC .... 455/69; 455/226.1; 455/226.3; 455/226.4; 455/67.11

(58) Field of Classification Search
None
See application file for complete search history.

(56) References Cited

U.S. PATENT DOCUMENTS

| | | | |
|---|---|---|---|
| 2007/0071145 A1* | 3/2007 | Perets | 375/346 |
| 2007/0149236 A1* | 6/2007 | Naden et al. | 455/522 |
| 2008/0025336 A1* | 1/2008 | Cho et al. | 370/432 |
| 2008/0101498 A1* | 5/2008 | Han et al. | 375/267 |
| 2009/0028112 A1* | 1/2009 | Attar et al. | 370/332 |
| 2009/0034639 A1* | 2/2009 | Hwang et al. | 375/260 |
| 2009/0074099 A1* | 3/2009 | Zheng et al. | 375/267 |
| 2009/0156227 A1* | 6/2009 | Frerking et al. | 455/455 |
| 2010/0150013 A1* | 6/2010 | Hara et al. | 370/252 |
| 2010/0166097 A1* | 7/2010 | Zhou et al. | 375/267 |
| 2010/0203916 A1* | 8/2010 | Tiwari et al. | 455/513 |
| 2010/0284351 A1* | 11/2010 | Liang et al. | 370/329 |
| 2011/0021236 A1* | 1/2011 | Dinan et al. | 455/522 |
| 2011/0212743 A1* | 9/2011 | Yokomakura et al. | 455/509 |

FOREIGN PATENT DOCUMENTS

WO    WO2009/022709    *  2/2009    ............. H04J 15/00

* cited by examiner

*Primary Examiner* — Zhiyu Lu
(74) *Attorney, Agent, or Firm* — Edell, Shapiro & Finnan, LLC (57) ABSTRACT

Techniques are provided herein for improving multiple-input multiple-output (MIMO) wireless communications, and in particular to dynamically determining when to switch MIMO transmission modes on a communication link between two devices that are capable of supporting multiple MIMO transmission modes. A base station receives from a client device one or more signals containing information representing a first signal-to-noise ratio (SNR) measurement and a second SNR measurement made by the client device. The first SNR measurement is associated with a first MIMO transmission mode and the second SNR measurement is associated with a second MIMO transmission mode. The base station computes a MIMO channel quality indicator from the first SNR measurement and the second SNR measurement, and evaluates the MIMO channel quality indicator to determine whether to switch MIMO transmission modes for transmissions to the client device.

19 Claims, 9 Drawing Sheets

MIMO MODE SWITCH MANAGEMENT FOR BEAMFORMED MIMO SYSTEMS

TECHNICAL FIELD

The present disclosure relates to wireless communication devices and systems and more particularly to multiple-input multiple-output (MIMO) wireless communication systems.

BACKGROUND

In wireless communication networks, a common architecture is to provide a wireless base station device that serves as a gateway for wireless communications with each of multiple wireless client devices, also called mobile stations. The base station may, for example, serve as a gateway to one or more wired networks. An example of such a network is one that involves wireless devices configured to comply with the communication standard of IEEE 802.16, known commercially as WiMAX™.

One way to increase throughput between the two devices, such as from the base station to the client device, is for the base station to employ multiple-input multiple-output (MIMO) communication techniques whereby multiple data streams are transmitted simultaneously via a plurality of antennas of the base station to a client device.

In some wireless communication systems, the devices on a communication link, e.g., a base station and a client device, are configured to support multiple MIMO transmission modes from the base station to the client device. The base station switches between MIMO transmission modes depending on the channel conditions between the two devices at any given time. For example, in a WiMAX system, the client device makes measurements based on signals it receives from the base station, and sends those measurements to the base station. The client device selects which MIMO transmission mode to use and sends this also to the base station.

There is room for improving the way mechanism by which a MIMO transmission mode is dynamically selected with respect to communication between two wireless devices capable of supporting multiple MIMO transmission modes.

DESCRIPTION OF EXAMPLE EMBODIMENTS

Overview

Techniques are provided herein for improving multiple-input multiple-output (MIMO) wireless communications, and in particular to dynamically determining when to switch MIMO transmission modes on a communication link between two devices that are capable of supporting multiple MIMO transmission modes. At a first wireless communication device, e.g., a base station, having a plurality of antennas, one or more signals are received from a second wireless communication device, e.g., a client device, the one or more signals containing information representing a first signal-to-noise ratio (SNR) measurement and a second SNR measurement made by the second wireless communication device. The first SNR measurement is associated with a first MIMO transmission mode and the second SNR measurement is associated with a second MIMO transmission mode. The first wireless communication device computes a MIMO channel quality indicator from the first SNR measurement and the second SNR measurement. The first wireless communication device evaluates the MIMO channel quality indicator to determine whether to switch MIMO transmission modes for transmissions to the second wireless communication device. In one form, the first MIMO transmission mode is one in which the first wireless communication device transmits a signal stream using a space time code technique via the plurality of antennas of the first wireless communication device to the second wireless communication device. The second MIMO transmission mode is one in which the first wireless communication device transmits multiple signal streams simultaneously from the plurality of antennas of the first wireless communication device to the second wireless communication device. Generally, second MIMO transmission mode has a higher throughput than the first MIMO transmission mode.

Example Embodiments

Figure 1:
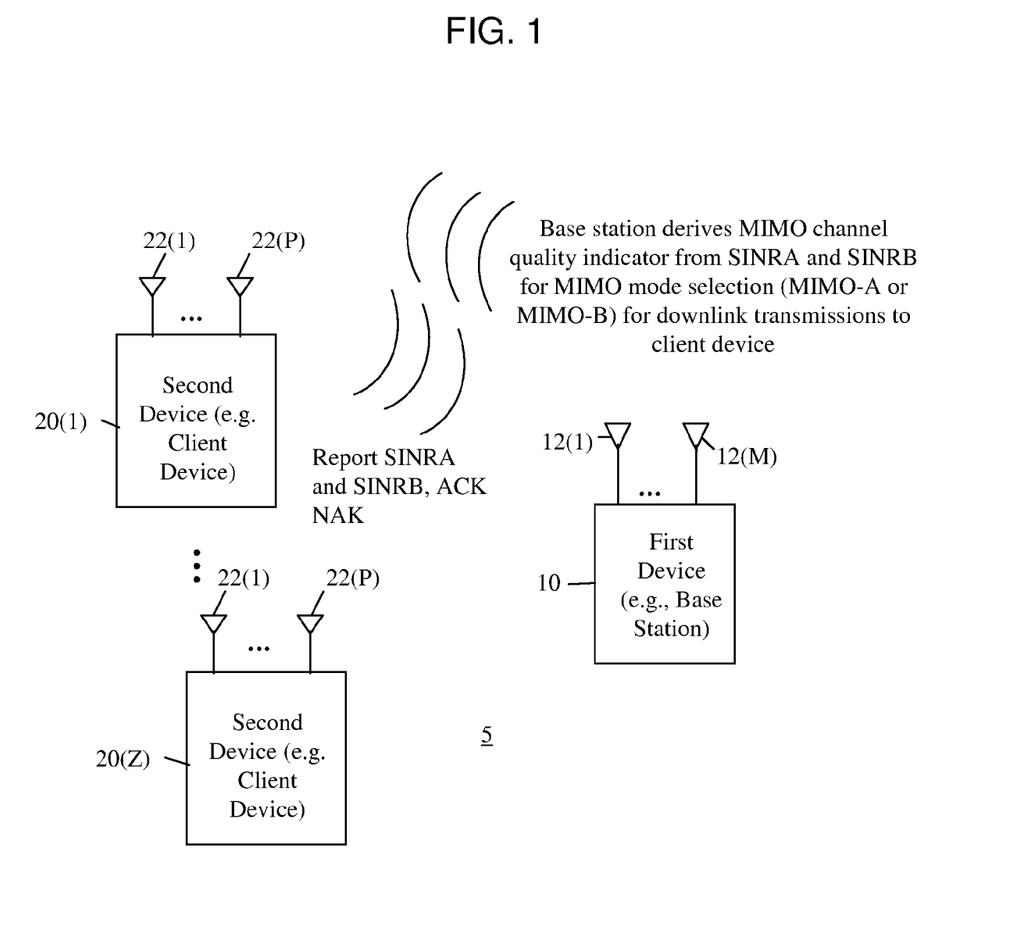
FIG. 1 is block diagram of a wireless communication network in which a base station device is configured to perform a select which of multiple MIMO transmission modes it should when sending downlink transmission to a client device.

Referring first to FIG. 1, a wireless communication network is shown at reference numeral 5. A wireless base station 10 comprising a plurality of antennas 12(1)-12(M) is provided to serve wireless communications with a plurality of wireless communication client devices 20(1)-20(Z). Each wireless client device 20(1)-20(Z) comprises at least one antenna, but in general it may comprise a plurality of antennas 22(1)-22(P). The base station 10 may be referred to herein as a first wireless communication device and the wireless client devices 20(1)-20(Z) as second wireless communication devices.

The base station 10 is configured to wirelessly communicate with the client devices 20(1)-20(Z) according to any of a variety of wireless communication standards, examples of which are the IEEE 802.16 standard known commercially as WiMAX™ and the IEEE 802.11 standard known commercially as WiFi™. Furthermore, the base station 10 is configured to send downlink transmissions to a given client device using MIMO communication techniques. For example, the base station 10 is configured to send downlink transmissions to a client device in either of first and second MIMO transmission modes. In the first MIMO transmission mode, the base station 10 uses a space time codes (e.g., Alamouti space time codes) in transmitting a signal stream via its plurality of antennas 12(1)-12(M) to improve the receive signal strength and channel quality by exploiting diversity gain. For example, in a WiMAX communication system, the first MIMO transmission mode is referred to a "MIMO-A". In the second MIMO transmission mode, the base station 10 uses a spatial multiplexing technique to transmit multiple signal streams simultaneously via the plurality of antennas of the base station 10 to improve the throughput over the link. For example, in a WiMAX system, the second MIMO transmission mode is referred to as "MIMO-B". The base station can apply beamforming weight vectors to the individual signal streams so as to weight each signal stream across the plurality of antennas 12(1)-12(M) to beamform the MIMO streams to a given client device.

MIMO-A and MIMO-B have different advantages. MIMO-A improves the channel quality. However, MIMO-B improves the throughput but does not improve the channel quality. Moreover, MIMO-B involves transmitting two signal streams and they may interfere with each other when wirelessly transmitted. Consequently, MIMO-B even imposes a more rigorous requirement on channel quality than MIMO-A.

In some systems, a client device computes the signal-to-interference-plus noise ratio (SINR), but referred also referred to hereinafter simply as signal-to-noise ratio (SNR), for both MIMO-A and MIMO-B, referred to herein as SINRA and SINRB, respectively. The client device chooses which MIMO mode based on its observations and measurements, and reports this to the base station on a periodic basis. The base station uses the information received from the client device to select the MIMO mode and modulation scheme for the downlink transmissions from the base station to the client device.

The WiMAX communication standard (IEEE 802.16) specifies the computations that a client device is to make when computing SINRA and SINRB. The definition adopted in the IEEE 802.16 standard for computing SINRA is similar to that used for a single-input single-output (SISO) channel and it turns out that it is fairly accurate in expressing the channel quality conditions and receive capabilities.

The same is not true for the definition for the MIMO-B computation defined in the IEEE 802.16 standard. The definition used for computing SINRB uses a theoretical capacity to compute an equivalent SINR. This is too optimistic. The theoretical capacity can only be achieved with optimum signal modulation, optimum detection and an infinite coding length. However, in a real-world system, such as a WiMAX system, modulation and detection schemes with some realistic limitations. The system could not achieve this capacity and the SINR based on the capacity would be overly optimistic. Consequently, in some systems, a client device uses this computation for SINRB under some circumstances when it is not appropriate to do so, which negatively affects SINR at the client device.

There are risks when switching from MIMO-A to MIMO-B. If the measurement computed for MIMO-B, SINRB, is too aggressive, higher order modulation and coding schemes used in MIMO-B would result in numerous errors at the client device. Furthermore, the spectral efficiency when operating in MIMO-B could be lower than event that of MIMO-A, resulting in lower throughput.

MIMO-B mode generally requires relatively good channel conditions and a high SNR at the client device. A MIMO mode switching scheme is disclosed herein that accounts for this and provides protections to ensure that when the decision is made to switch to MIMO-B, that the channel conditions can truly support it. The base station 10 receives from a client device messages containing values for SINRA and SINRB. In addition, depending on whether a client device successfully receives a message from the base station 10, the base station 10 will also receive from the client device an acknowledgment (ACK) message and a no-acknowledgment (NAK) message.

Figure 2:
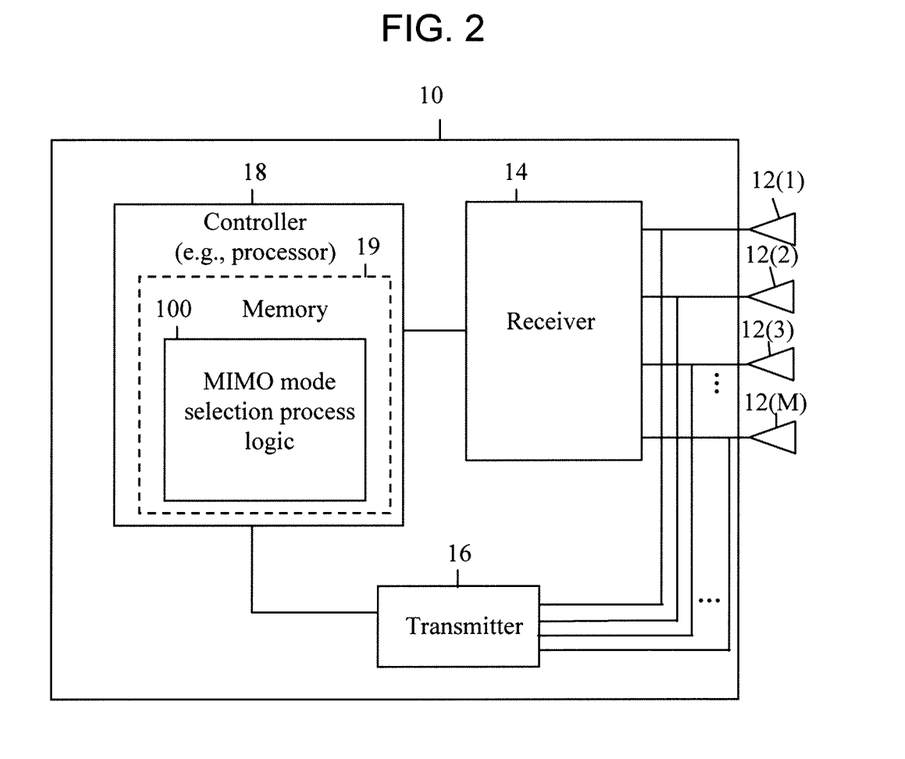
FIG. 2 is a block diagram of a first wireless communication device, e.g., a base station, configured to dynamically switch between MIMO transmission modes.

Reference is now made to FIG. 2 for a description of a wireless communication device, e.g., base station 10, that is configured or equipped to perform the aforementioned MIMO-mode switching techniques. The base station 10 comprises a receiver 14, a transmitter 16 and a controller 18. The controller 18 supplies data (in the form of transmit signals) to the transmitter 16 to be transmitted and processes signals received by the receiver 14. In addition, the controller 18 performs other transmit and receive control functionality. Parts of the functions of the receiver 14, transmitter 16 and controller 18 may be implemented in a modem and other parts of the receiver 14 and transmitter 16 may be implemented in radio transmitter and radio transceiver circuits. It should be understood that there are analog-to-digital converters (ADCs) and digital-to-analog converters (DACs) in the various signal paths to convert between analog and digital signals.

The receiver 14 receives the signals detected by each of the antennas 12(1)-12(M) and supplies corresponding antenna-specific receive signals to the controller 18. It is understood that the receiver 14 may comprise a plurality of individual receiver circuits, each for a corresponding one of a plurality of antennas 12(1)-12(M) and which outputs a receive signal associated with a signal detected by a respective one of the plurality of antennas 12(1)-12(M). For simplicity, these individual receiver circuits are not shown. The transmitter 16 may comprise individual transmitter circuits that supply respective upconverted signals to corresponding ones of a plurality of antennas 12(1)-12(M) for transmission. For simplicity, these individual transmitter circuits are not shown. The controller 18 applies downlink beamforming weight vectors to the multiple downlink transmission streams (e.g., symbol streams) to produce transmit signals. The controller 18 supplies the transmit signals to the transmitter 16 and the transmitter radio frequency (RF) modulates (e.g., upconverts) the respective transmit signals for transmission via respective ones of the plurality of antennas.

The controller 18 is, for example, a signal or data processor that comprises a memory 19 or other data storage block that stores data used for the techniques described herein. The memory 19 may be separate or part of the controller 18. Instructions for MIMO mode selection process logic 100 are stored in the memory 19 for execution by the controller 18.

The functions of the controller 18 may be implemented by logic encoded in one or more tangible media (e.g., embedded logic such as an application specific integrated circuit, digital signal processor instructions, software that is executed by a processor, etc.), wherein the memory 19 stores data used for the computations described herein and stores software or processor instructions that are executed to carry out the computations described herein. Thus, the process logic 100 may take any of a variety of forms, so as to be encoded in one or more tangible media for execution, such as with fixed logic or programmable logic (e.g., software/computer instructions executed by a processor) and the controller 18 may be a programmable processor, programmable digital logic (e.g., field programmable gate array) or an application specific integrated circuit (ASIC) that comprises fixed digital logic, or a combination thereof. For example, the controller 18 may be a modem in the base station and thus be embodied by digital logic gates in a fixed or programmable digital logic integrated circuit, which digital logic gates are configured to perform the process logic 100. In another form, the process logic 100 may be embodied in a processor readable medium that is encoded with instructions for execution by a processor (e.g., controller 18) that, when executed by the processor, are operable to cause the processor to perform the functions described herein in connection with process logic 100, as well as processes 200 and 300 described herein.

As will become more apparent hereinafter, a wireless communication device or apparatus (base station) is provided that comprises a plurality of antennas, a receiver configured to be coupled to the plurality of antennas and to produce receive signals associated with received transmissions received at the plurality of antennas from a wireless communication client device, a transmitter configured to be coupled to the plurality of antennas and to produce transmit signals to be transmitted via the plurality of antennas to the wireless communication device; and a controller configured to be coupled to the receiver. The controller is configured to obtain from a received transmission from the wireless communication device a first SNR measurement made by the wireless communication device with respect to a first MIMO transmission mode and a second SNR measurement made by the wireless communication device with respect to a second MIMO transmission mode. The controller is configured to compute a MIMO channel quality indicator from the first SNR measurement and the second SNR measurement, and to evaluate the MIMO channel quality indicator to determine whether to switch MIMO transmission modes for transmissions to the second wireless communication device. It is not necessary to receive the first and second SNR measurements simultaneously, as described herein. Furthermore, while the techniques are described herein as involving the first and second SNR measurements being sent to the base station where the MIMO channel quality indicator is computed, there may be situations where the MIMO channel quality indicator is computed at the client device based on the first and second SNR measurements made at the client device, and the client device then transmits a message containing the MIMO channel quality indicator to the base station. However, the form where the base station computes the MIMO channel quality indicator is one that is easy to implement in a base station because some communication standards, such as WiMAX, already require client devices to send the first and second SNR measurements.

Moreover, a processor readable medium is provided that is encoded with or stores instructions, that when executed by a processor, cause the processor to, at a first wireless communication device, obtain from one or more signals received from a second wireless communication device information representing a first signal-to-noise ratio SNR measurement made by the second wireless communication device with respect to a first MIMO transmission mode and a second SNR measurement made by the second wireless communication device with respect to a second MIMO transmission mode, wherein the second MIMO transmission mode has a higher throughput than the first MIMO transmission mode; compute a MIMO channel quality indicator from the first SNR measurement and the second SNR measurement; and evaluate the MIMO channel quality indicator to determine whether to switch MIMO transmission modes for transmissions to the second wireless communication device.

Figure 3:
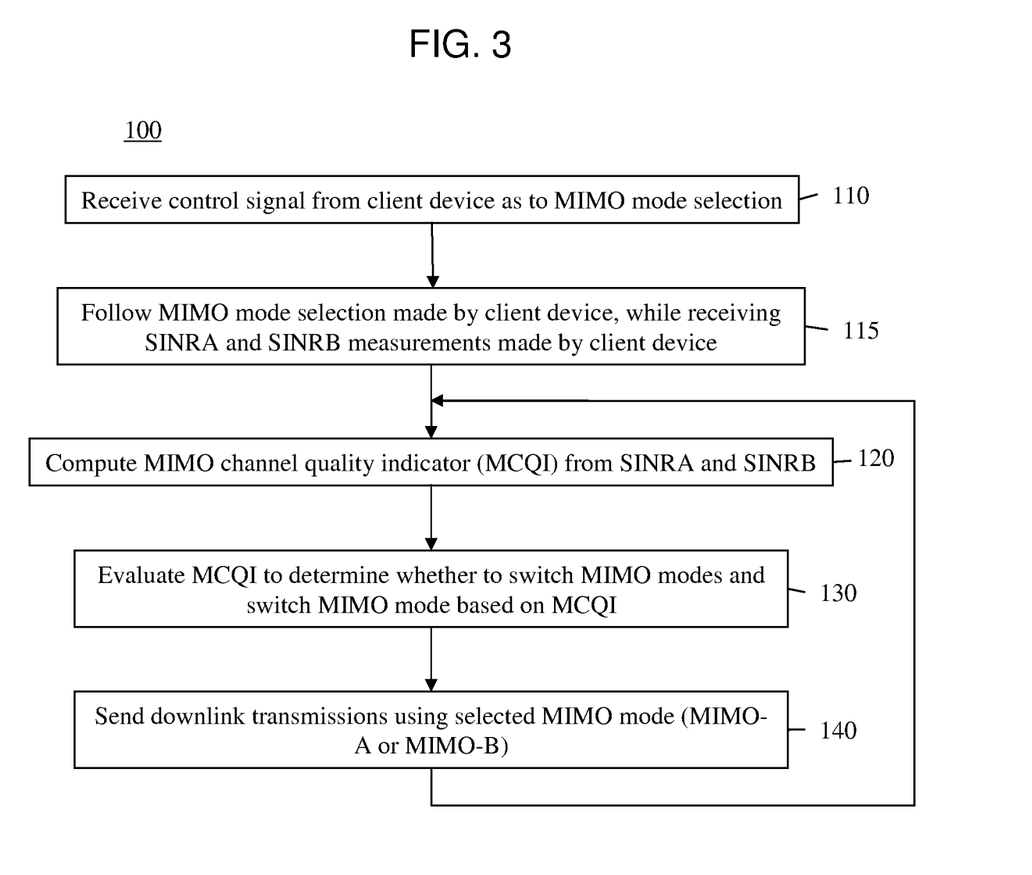
FIG. 3 is a flow chart generally depicting a process performed at a base station for dynamically switching between MIMO transmission modes.

Turning to FIG. 3, a flow chart representing the process logic 100 is now described. The process logic 100 is executed at a first wireless communication device, e.g., base station 10, that is communicating with a second wireless communication device, e.g., one of the client devices 20(1)-20(P). The process logic 100 operates on the basis of SINR measurements made for the first and second MIMO modes. However, as indicated in FIG. 3, during an initial phase, the client device may drive the MIMO mode selection based on SINR measurements made at the client device. At 110, the base station receives a control signal from the client device indicating the MIMO mode selection made at the client device. At 120, the base station follows the MIMO mode selection made by the client device based on the received control signal and transmits in the selected mode accordingly. Meanwhile, as also indicated at 120, the base station receives signals containing first and second SNR measurements (e.g., SINRA and SINRB) from the client device.

At 120, using the received SINRA and SINRB measurements, the base station computes a MIMO channel quality indicator (MCQI). There are several ways to compute the MCQI. One technique is to compute a difference between the two measurements, e.g., SINRA-SINRB. Another technique is to compute a ratio between the two measurements, e.g., SINRA/SINRB. Still another technique is to compute $$\left(\frac{SINRA}{SINRA} + \sqrt{\frac{SINRA^2}{SINRB^2} - 4}\right)\bigg/2.$$

This latter computation is derived from the following computations, where $C_A$ is a channel capacity for MIMO-A, $C_B$ is the channel capacity for MIMO-B, H is the channel matrix, where $$C_A = \log\left(z + \frac{\|H\|_F^2}{\sigma^2}\right) \approx \log\left(\frac{\|UDV'\|_F^2}{\sigma^2}\right) = \log\left(\frac{\|D\|_F^2}{\sigma^2}\right) = \log\left(\frac{\lambda_1^2 + \lambda_2^2}{\sigma^2}\right)$$

$$SINRA = e^{C_A} - q \approx e^{C_A} = \frac{\lambda_1^2 + \lambda_2^2}{\sigma^2}$$

$$C_B = \frac{1}{2}\text{logdet}\left(zI + \frac{H'H}{\sigma^2}\right) \approx \frac{1}{2}\text{logdet}\left(\frac{U'D'DU}{\sigma^2}\right) =$$

$$\frac{1}{2}\text{logdet}\left(\frac{D'D}{\sigma^2}\right) = \log\left(\frac{\lambda_1\lambda_2}{\sigma^2}\right)$$

$$SINRB = e^{C_B} - q \approx e^{C_B} = \frac{\lambda_1\lambda_2}{\sigma^2}$$

$$z \in \{0, 1\}, q \in \{0, 1\}$$

$$MCQI = \frac{\lambda_1}{\lambda_2} \approx \left(\frac{SINRA}{SINRB} + \sqrt{\frac{SINRA^2}{SINRB^2} - 4}\right)\bigg/2,$$

where the variables z and q are predefined parameters used in the SINRA and SINRB measurement computations made at the wireless client device and that depend on an implementation of the wireless client device, σ is a noise and interference variance. U, D, V are matrices after the singular value decomposition of the channel matrix H. where U and V are unitary matrices, D is a diagonal matrix, I is the identity matrix, and $\lambda_1$ and $\lambda_2$ are the two eigenvalues of the channel matrix H. Again, the MCQI computation is made at the base station.

The MCQI is an approximation of the channel capacity of the MIMO channel. In one form, the MCQI is always a positive number and greater than or equal to 1. When the MCQI is large, this indicates that the channel is highly correlated in the spatial domain such that it would be difficult for a client device to distinguish two spatial streams. Thus, the MIMO-B mode may not perform well when MCQI is quite large even though SINRB may be relatively high. When the MCQI is small (close to 1), the channel correlation is low and MIMO-B would likely operate well.

It is not necessary to have the SINRA and SINRB simultaneously when computing the MCQI. The MCQI may be computed values for SINRA and SINRB reported by a client device in different reporting periods or events.

At 130, the MCQI is evaluated to determine whether to switch MIMO mode, e.g., from MIMO-B to MIMO-A or from MIMO-A to MIMO-B. This occurs dynamically based on SINR measurement reports from the client device and other factors. At 130, the base station dynamically switches MIMO modes, if the MCQI justifies a switch. For example, the MCQI is compared with a threshold. There are many ways to evaluate the MCQI for determining whether or not to make a switch. At 140, the base station sends downlink transmissions to the client device using the selected MIMO mode as determined at 130.

Figure 4:
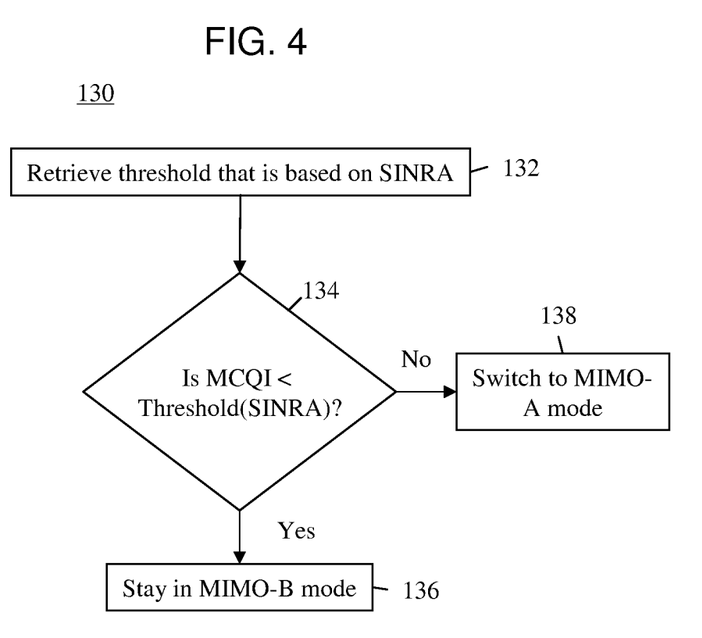
FIG. 4 is a flow chart depicting a one process for evaluating a MIMO channel quality indicator to determine when to switch MIMO transmission modes.

FIG. 4 illustrates a first technique to evaluate the MCQI for determining whether or not the base station switches MIMO modes. In this technique, data is generated from simulations and other analysis to generate a plurality of thresholds that depend on the first SNR measurement, e.g., SINRA. Thus, the threshold used for the evaluation of the MCQI depends on the latest reported SINRA. For example, the base station stores data representing a plurality of values for SINRA and a corresponding threshold for each SINRA value. The table below is an example of the data stored in a base station.

TABLE 1

Example values for SINRA-dependent threshold.

| SINRA | | | | | | | |
|---|---|---|---|---|---|---|---|
| 23 | 24 | 25 | 26 | 27 | 28 | 29 | 30 |
| Threshold | | | | | | | |
| 9 | 10 | 11.5 | 12.5 | 13 | 13 | 13 | 16 |

As an alternative to storing data for multiple thresholds, the threshold may be computed using an appropriate mathematical function based on the latest report SINRA measurement.

At 132, the threshold that is used for the comparison is determined based on the latest reported SINRA measurement received from the client device, such as from the stored data (interpolating or extrapolating as necessary) or by direct computation. At 134, the MCQI is compared with the threshold (SINRA). When the MCQI is less than the threshold, then at 136 the base station stays in the MIMO-B transmission mode. When the MCQI is greater than the threshold, then at 138 base station switches to the MIMO-A transmission mode.

Figure 5:
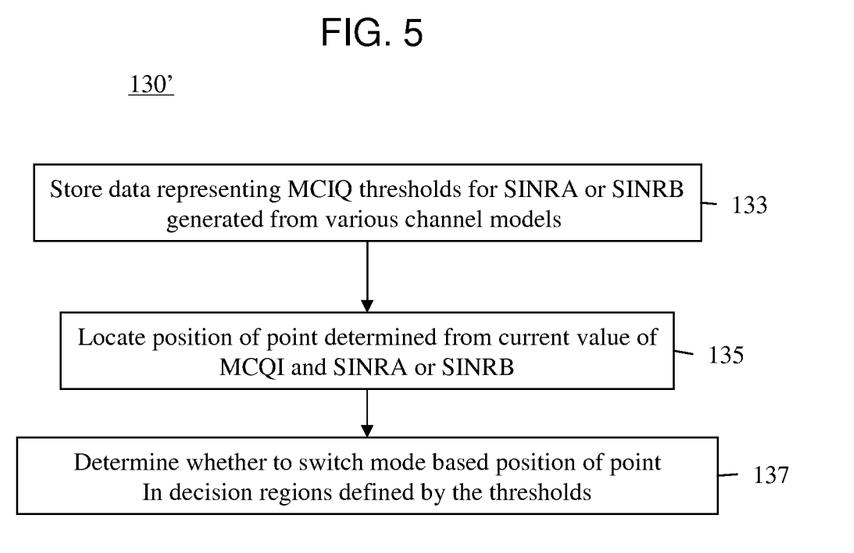
FIG. 5 is a flow chart depicting another process for evaluating a MIMO channel quality indicator to determine when to switch MIMO transmission modes.
Figure 6:
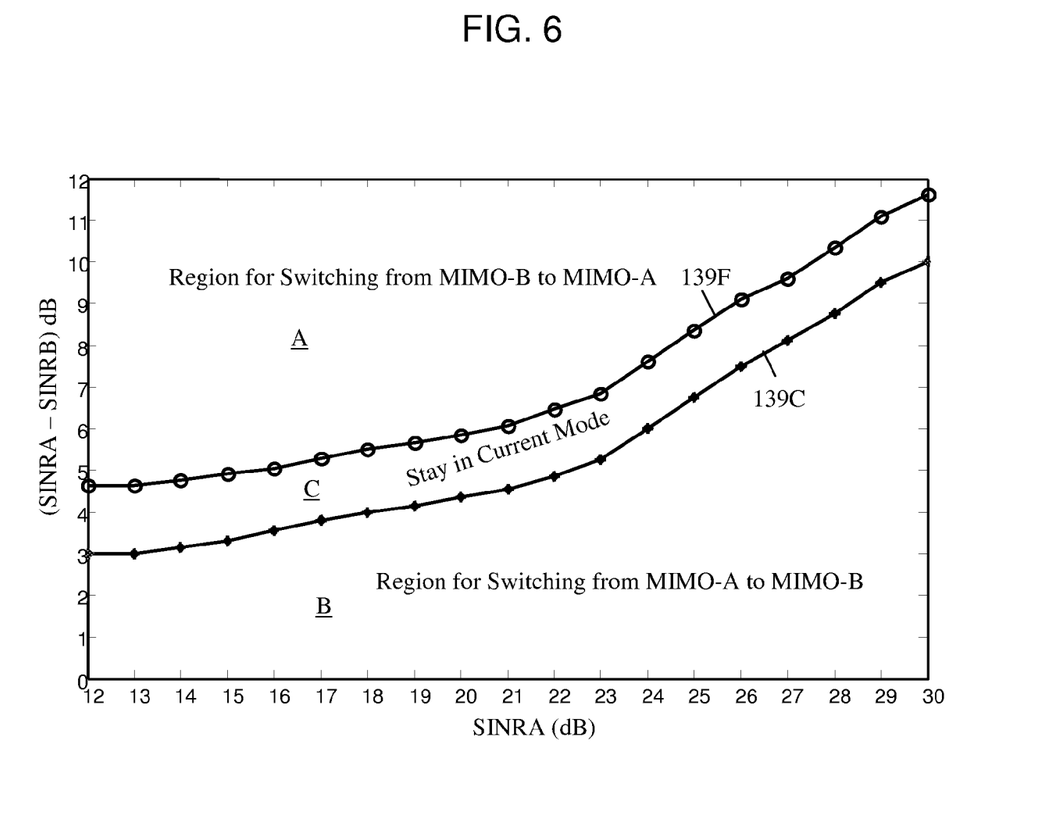
FIGS. 6 and 7 are diagrams showing plots of data used in connection with the evaluation process of FIG. 5.
Figure 7:
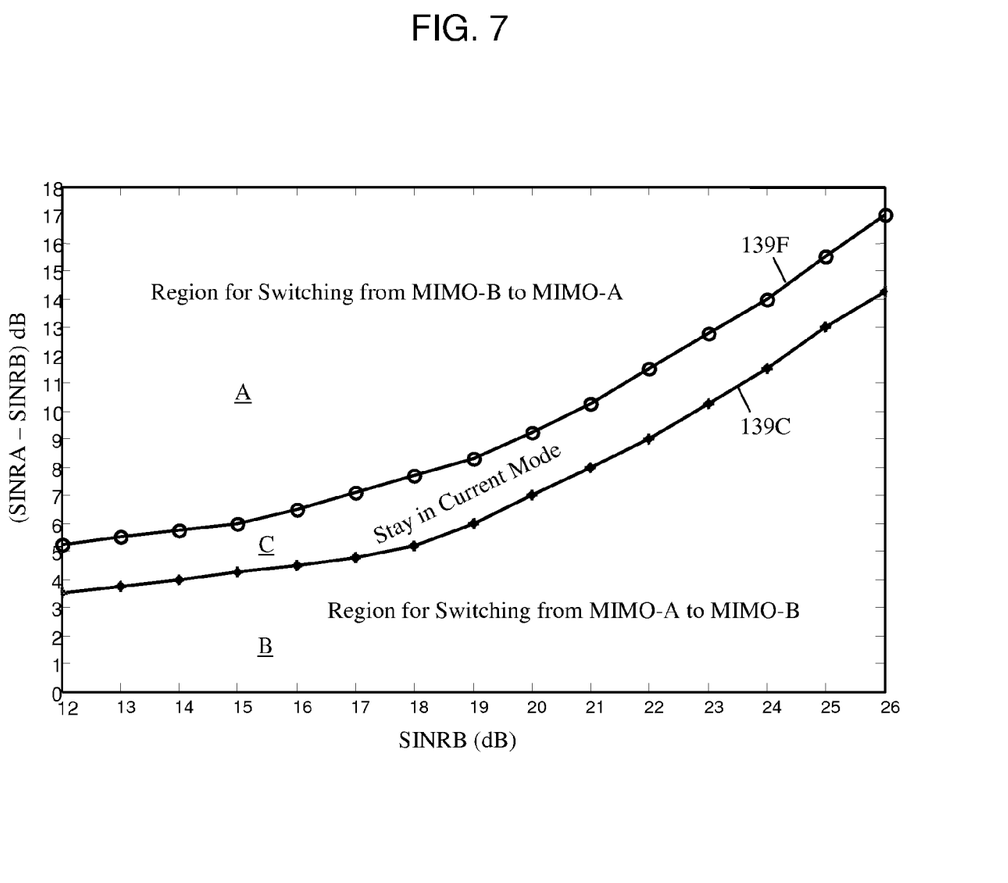

Turning to FIGS. 5-7, another technique, shown at 130' is described for evaluating the MCQI. In this technique, at 133. the base station stores data representing decision thresholds for a plurality of values of MCIQ and a plurality of values for SINRA and/or data representing decision thresholds for a plurality of values of MCIQ and a plurality of values for SINRB. In generating this data, one or more channel models may be used, such as the Spatial Channel Model (SCM). In addition, path delay parameters used for the channel model may be those that are publicly available, such as for the Pedestrian A (PA) mode, Pedestrian B (PB) mode, Vehicular A (VA) mode and Panama channel mode. FIG. 6 illustrates examples of plots of thresholds for (SINRA-SINRB) vs. SINRA, and FIG. 7 illustrates examples of plots of thresholds for (SINRA-SINRB) vs. SINRB. Thus, FIG. 6 represents stored data for SINRA dependent thresholds that define decision regions for evaluating the (SINRA-SINRB) together with the latest reported SINRB measurement. FIG. 7 represents stored data for SINRB dependent thresholds that define decision regions for evaluating the (SINRA-SINRB) together with the latest reported SINRB measurement.

At 135, a position of a point determined from a current value computed for (SINRA-SINRB) and the latest reported SINRA (or SINRB) is located relative to the stored data for the (SINRA-SINRB) vs. SINRA thresholds (FIG. 6) or relative to the stored data representing (SINRA-SINRB) vs. SINRB thresholds (FIG. 7). At 137, a determination is made whether to switch MIMO mode based on the location of the point in decision regions defined by the thresholds referred to above at 133.

More specifically, with reference to the example shown in FIG. 6, there are two curves that define three decision regions A, B and C. The first curve 139F defines a floor threshold with respect to decision region A and the second curve 139C defines a ceiling threshold with respect to decision region B. Moreover, the decision region C is that region which is less than the first curve 139F and greater than the second curve 139C.

A point is determined from the value computed for (SINRA-SINRB) and the latest reported SINRA measurement. The location of this point is determined with respect to the decision regions A, B and C. When the position of the point is determined to be in region A, then the base station switches from MIMO-B to MIMO-A (or if already operating in MIMO-A, the base station stays in MIMO-A). When the position of the point is determined to be in region B, then the base station switches from MIMO-A to MIMO-B (or if already operating in MIMO-B, the base station says in MIMO-B). When the position of the point is determined to be in region C, then the base station stays in its current MIMO mode.

FIG. 7 illustrates a similar scenario as that shown in FIG. 6, but instead of SINRA used to locate the point, SINRB (together with (SINRA-SINRB)) is used to locate the point. The three decision regions A, B and C operate similar to that described above in connection with FIG. 6.

Thus, according to the techniques depicted by FIGS. 5-7, data is stored that represents thresholds that are dependent on the first SNR measurement (SINRA) or the second SNR measurement (SINRB). A position of a point is located with respect to decision regions defined by the thresholds, where the point is derived from the difference between SINRA and SINRB, e.g., (SINRA-SINRB), and the first SNR measurement (SINRA) or the second SNR measurement (SINRB). The determination as to whether to switch MIMO transmission modes is made based on the location of point relative to the decision regions. Furthermore, the stored data comprises data represents a first curve defining a floor threshold with respect to a first decision region where the MIMO transmission mode is to be switched from the second MIMO transmission mode (MIMO-B) to the first MIMO transmission mode (MIMO-A), and a second curve defining a ceiling with respect to a second decision region where the MIMO transmission mode is to be switched from the first MIMO transmission mode (MIMO-A) to the second MIMO transmission mode (MIMO-B), and wherein a third decision region is defined between the first curve and the second curve where the MIMO transmission mode is to be unchanged.

Figure 8:
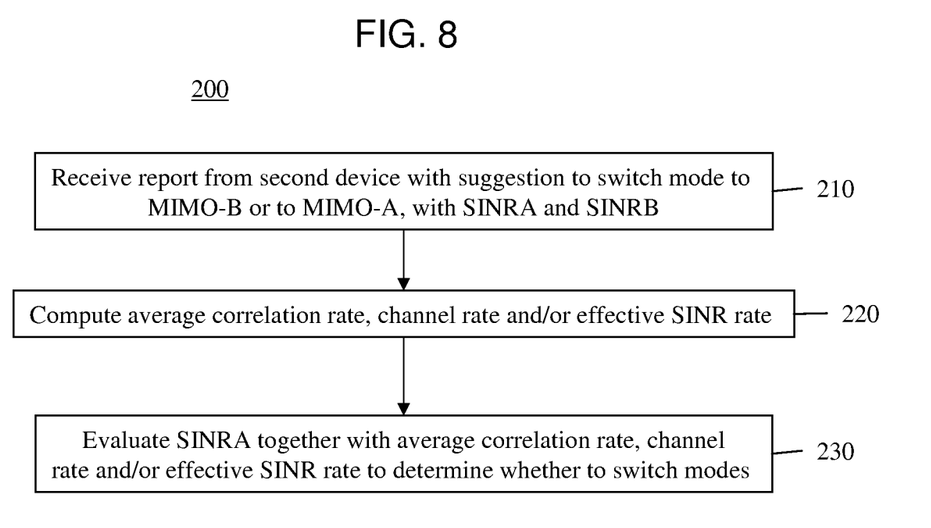
FIG. 8 is a flow chart depicting another process for determining when to switch between MIMO transmission modes.
Figure 9:
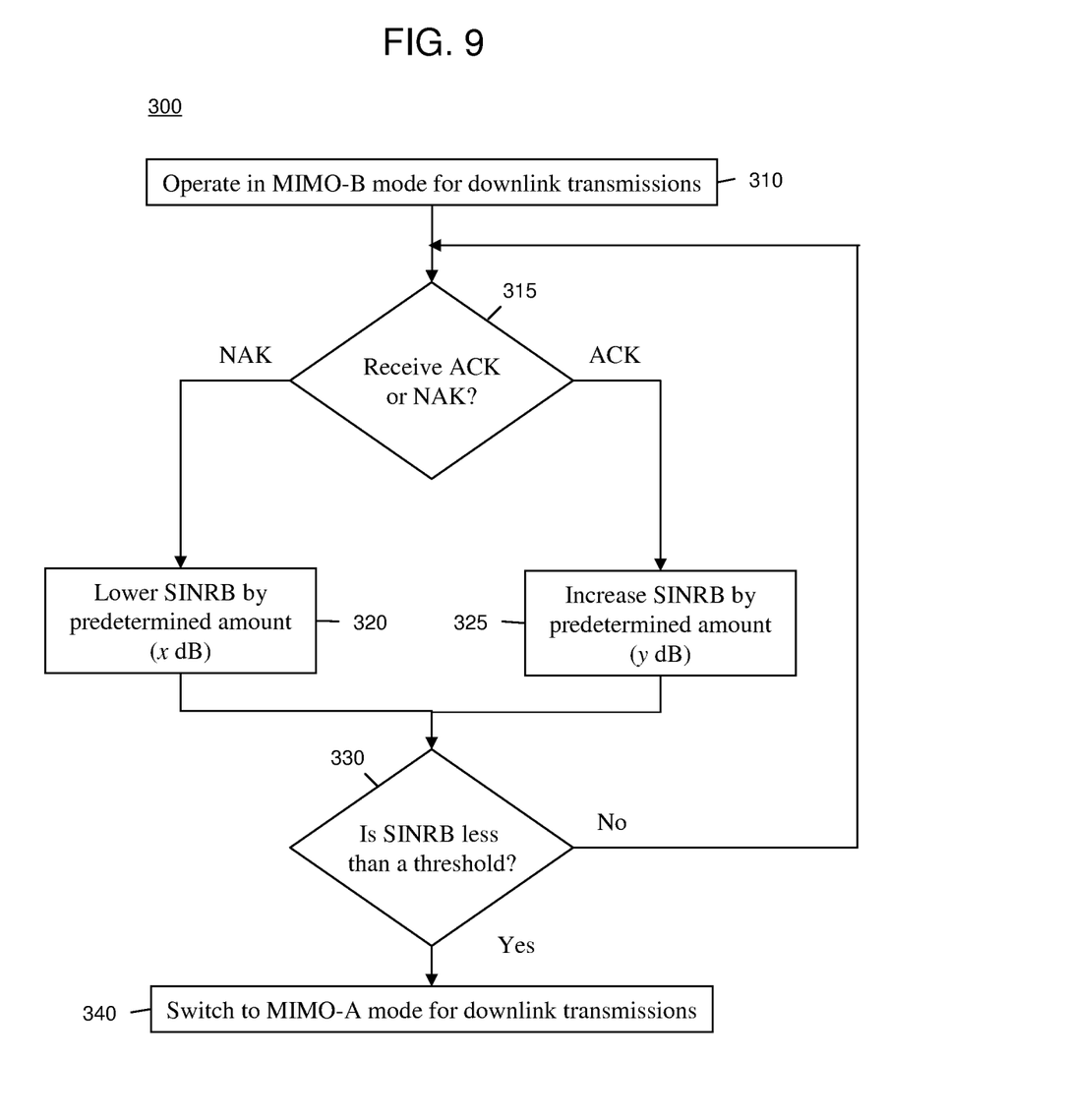
FIG. 9 is a flow chart depicting still another process for determining when to switch between MIMO transmission modes.

FIGS. 8 and 9 illustrate flow charts for processes 200 and 300 that may also be employed by the base station, in addition to, or instead of, the process 100 described herein.

Referring now to FIG. 8, the process 200 for determining when to switch MIMO transmissions is now described. In this process, shown generally at 200, the base station makes a decision of whether or not to switch MIMO transmission modes using SINRA or SINRB measurements and a measurement of the channel condition with respect to one antenna (or a subset of all of the antennas) of the client device. The measurement of the channel condition with respect to one antenna of the client device is represented in terms of a correlation between a plurality of downlink beamforming weight vectors, e.g., first and second beamforming weight vectors, used by the base station 10 during the MIMO-B transmission mode. The channel conditions may vary over time and certainly are not the same for all client devices. The average correlation rate for the estimated beamforming weight vectors is denoted $r_1$. For example, the average channel correlation rate $r_1$ is computed from the two estimated beamforming weight vectors for a plurality of subcarriers received over time (i.e., in each so-called "tile"), by the computation $abs(w_{j,1}{}^H * w_{j,2})/(norm(w_{j,1})norm(w_{j,2}))$, where $w_{j,1}$ or $W_{j,2}$ is an M by 1 estimated beamforming weight vector in the jth tile, and $^H$ is the Hermitian operation. There is one value for the average channel correlation rate $r_1$ for each tile.

In addition, the base station may compute a channel rate between a power of a strongest path and total power of all other paths to the client device. The channel rate is denoted $c_1$. The channel rate $c_1$ is the power of a strongest path with respect to the total power of all paths (including the strongest path) with respect to signals received at the base station from a client device. The base station determines the paths using direction of arrival analysis or time-delay analysis. Numerous techniques of this type are known. For example, the base station 10 is configured to compute an estimate of the ratio between a power associated with the strongest direction of arrival (DOA) at its plurality of antennas with respect to the power of all the other directions of arrival from that client device. One technique to compute this ratio is to compute a covariance matrix $R_{UL}$ from received uplink transmissions as $$R_{UL} = \sum_{i=1}^{N} Y_i(Y_i)^H,$$

where $^H$ denotes the Hermitian operation. Then, using singular value decomposition techniques, the singular values of the covariance matrix $R_{UL}$ is computed to obtain a plurality of eigenvectors. For example, the L eigenvectors of the covariance matrix $R_{UL}$ are $\{\tilde{U}_1, \tilde{U}_2, \ldots, \tilde{U}_L\}$ corresponding to the eigenvalues $\{\tilde{\Lambda}_1, \tilde{\Lambda}_2, \ldots, \tilde{\Lambda}_L\}$ with $\tilde{\Lambda}_1 \geq \tilde{\Lambda}_2 \geq \ldots \geq \tilde{\Lambda}_L$. Then, a ratio $M_u$ is computed from eigenvalues $\{\tilde{\Lambda}_1, \tilde{\Lambda}_2, \ldots, \tilde{\Lambda}_L\}$ as $\tilde{\Lambda}_1/(\tilde{\Lambda}_2+\tilde{\Lambda}_3+\ldots+\tilde{\Lambda}_L)$. That is, the ratio $M_u$ is a ratio of the strongest DOA $\tilde{\Lambda}_1$ with respect to a sum of all of the other DOAs and may be used for the channel rate $c_1$.

Further still, the base station 10 may compute an effective SINR (ESINR) rate denoted $r_2$ from uplink signals received from the client device. For example, the effective SINR rate $r_2$ is computed as $10^{(UL\_SINR-UL\_PCINR)}/10*min(P\_total)/max(P\_total)$, wherein UL_ESINR is an uplink effective SINR and UL_PSINR is an uplink physical SINR (PSINR) and P_total is as explained below. ESINR may be equivalent to SINR in an additive white Gaussian noise (AWGN channel). PSINR is the average/mean SINR in some frequency bands associated with an uplink signal received at the base station 10 from the client device. For example, the IEEE 802.16 standard suggests methods to calculate the ESINR and PSINR. These methods are specific to certain equipment vendors and are calculated by the base station based on the received signal from a client device.

In one example, the base station 10 receives a sequence of uplink signals from the client device, and within each signal, the base station computes power values for a sequence of frequency subcarriers (e.g., pilot subcarriers) and uses these subcarriers to compute PSINR and ESINR. The base station 10 adds the power values computed at the sequence of frequency subcarriers to produce a quantity represented by vector of P_total. Due to channel variations, the values of power in the vector P_total are not the same, except in a AWGN channel, in which case PSINR=ESINR.

At 210, the base station receives a report from a client device with a suggestion as to whether to switch MIMO transmission modes (and to which transmission mode a switch is to be made) together with a measurement of SINRA and/or SINRB. At 220, one or more of the average correlation rate $r_1$, channel rate $c_1$ and ESINR rate $r_2$ are computed as explained above. At 230, one or both of the SINRA and SINRB are evaluated together with one or more of the average correlation rate $r_1$, channel rate $c_1$ and ESINR rate $r_2$ to determine whether to switch MIMO transmission modes.

Examples of evaluation procedures performed at 230 are as follows.

First Evaluation Scheme

1. If SINRA<first threshold (e.g., 20 dB) and $r_1 < f_{threshold1}$, and $c_1 < g_{threshold1}$, then switch from MIMO-A to MIMO-B, otherwise stay in MIMO-A.

2. If first threshold<SINRA<second threshold (e.g., 26 dB) and $r_1 < f_{threshold2}$, and $c_1 < g_{threshold2}$, then switch MIMO-A to MIMO-B, otherwise stay in MIMO-A.

3. If SINRA>second threshold (e.g., 26 dB) and $r_1 < f_{threshold3}$, and $c_1 < g_{threshold3}$, then MIMO-A to MIMO-B, otherwise stay in MIMO-A.

Examples of thresholds used in the above evaluation are $f_{threshold1}=0.5$, $f_{threshold2}=0.7$, $f_{threshold3}=0.9$. The evaluation logic above may be modified to only use average correlation rate $r_1$ or the channel rate $c_1$ instead of both.

Second Evaluation Scheme

1. If SINRA<first threshold (e.g., 20 dB) and $r_2 < h_{threshold1}$, then switch MIMO-A to MIMO-B, otherwise stay in MIMO-A.

2. If first threshold<SINRA<second threshold (e.g., 26 dB) and $r_2 < h_{threshold2}$, then switch from MIMO-A to MIMO-B, otherwise stay in MIMO-A.

3. If SINRA>second threshold (e.g., 26 dB) and $r_2 < h_{threshold3}$, then switch MIMO-A to MIMO-B, otherwise stay in MIMO-A.

Examples of thresholds to use in this scheme are $h_{threshold1}=0.9$, $h_{threshold2}=0.95$, $h_{threshold3}=0.98$.

Third Evaluation Scheme

A mean channel correlation rate $r_3$ is the mean value of the channel correlation rate between different received uplink tiles (groups of subcarriers, referred to as tiles in a WiMAX system), and each channel correlation rate is computed as $abs(h_i{}^H h_j)/(norm(h_i)norm(h_j))$, where is a M by 1 channel vector in the j tile, where $^H$ is the Hermitian operation.

1. When $r_3$>threshold (e.g., 0.6):

a. If SINRA<first threshold (e.g., 20 dB) and $r_3 < q_{threshold1}$, then switch from MIMO-A to MIMO-B, otherwise stay in MIMO-A.

b. If first threshold<SINRA<second threshold (e.g., 26 dB) and $r_3 < q_{threshold2}$, switch from MIMO-A to MIMO-B, otherwise stay in MIMO-A.

c. If SINRA>26 dB and $r_3 < q_{threshold3}$, then switch from MIMO-A to MIMO-B, otherwise stay in MIMO-A.

2. When $r_3$<threshold (e.g., 0.6):

a. If SINRA<first threshold (e.g., 20 dB) and $r_3<b_{threshold1}$, then switch from MIMO-A to MIMO-B, otherwise stay in MIMO-A.

b. If first threshold<SINRA<second threshold (e.g., 26 dB) and $r_3<b_{threshold2}$, then switch from MIMO-A to MIMO-B, otherwise stay in MIMO-A.

c. If SINRA>second threshold (e.g., 26 dB) and $r_3<b_{threshold3}$, then switch from MIMO-A to MIMO-B, otherwise stay in MIMO-A.

In this evaluation, thresholds that may be used are $q_{threshold1}=0.85$, $q_{threshold2}=0.9$, $q_{threshold3}=0.98$; $b_{threshold1}=0.8$, $b_{threshold2}=0.85$, $b_{threshold3}=0.95$.

In each of the evaluation schemes above, SINRB could be used instead of SINRB.

The process of FIG. 9 may be summarized as follows. Based on signals received from the client device and based on the SINRA or SINRB measurements received from the client device, the base station computes one or more of an average correlation rate with respect to a correlation between downlink beamforming weight vectors used by the base station when transmitting to the client device, a channel rate based on power of signals received at the plurality of antennas of the base station via multiple paths, and an effective SNR rate derived from power at subcarriers of received signals at the base station. The base station evaluates one or more of the average correlation rate, channel correlation rate and effective SNR rate with respect to corresponding thresholds to determine whether to switch MIMO transmission modes.

Referring now to FIG. 9, the process 300 for evaluating SINR measurements received from a client device at the base station to determine whether and when to switch MIMO transmission modes is described. In the process 300, packet error is used to determine whether to switch MIMO transmission modes together with ACK or NAK messages. At 310, the base station is operating in MIMO-B mode for downlink transmission to a client device. At 315, the base station determines whether it has received an ACK or a NAK in response to a downlink transmission it sent to a client device. When a NAK is received with respect to a message (or series of messages), then at 320, the base station lowers the SINRB measurement it is tracking for that client device by a predetermined amount, e.g., x dB. When an ACK is received with respect to a message (or series of messages), then at 325, the base station increases the SINRB measurement it is tracking for that client device by a predetermined amount, e.g., y dB. Values for the decrement amount x and the increment y are chosen to set a tolerable target packet error rate. For example, x=1 and y=1/64.

At 330, the base station compares the current value of SINRB for that client device with a threshold, when SINRB is determined to be less than the threshold, the base station 10 switches back to MIMO-A from MIMO-B; otherwise, the base station stays in MIMO-B, and the process repeats from 315.

The foregoing description of the process 300 pertains to updating SINRB while the base station 10 is operating in MIMO-B mode. However, it may just as well be applied to SINRA measurements while the base station 10 is operating in MIMO-A mode. In general, the base station may be configured to update a stored value representing the first SNR measurement or a stored value representing the second SNR measurement depending on whether an acknowledgment message is received from the client device at the base station in response to transmissions sent to the client device while the base station is sending transmissions in the first MIMO transmission mode or second MIMO transmission mode, respectively. The base station compares the first SNR measurement or second SNR measurement after it is updated to determine whether to switch MIMO transmission modes, i.e., from the second MIMO transmission mode to the first MIMO transmission mode or from the first MIMO transmission mode to the second MIMO transmission mode.

The above description is intended by way of example only. Various modifications and structural changes may be made therein without departing from the scope of the concepts described herein and within the scope and range of equivalents of the claims.

What is claimed is:

1. A method comprising:

at a first wireless communication device having a plurality of antennas, receiving from a second wireless communication device one or more signals containing information representing a first signal-to-noise ratio (SNR) measurement made by the second wireless communication device with respect to a first multiple-input multiple-output (MIMO) transmission mode in which the first wireless communication device uses a space time code technique to transmit a signal stream via the plurality of antennas of the first wireless communication device to the second wireless communication device and a second SNR measurement made by the second wireless communication device with respect to a second MIMO transmission mode in which the first wireless communication device uses a spatial multiplexing technique to transmit multiple signal streams simultaneously via the plurality of antennas to the second wireless communication device;

at the first wireless communication device, computing a MIMO channel quality indicator based on a ratio of the first SNR measurement to the second SNR measurement; and at the first wireless communication device, evaluating the MIMO channel quality indicator to determine whether to switch MIMO transmission modes for transmissions to the second wireless communication device.

2. The method of claim 1, wherein evaluating comprises comparing the MIMO channel quality indicator with a threshold, and switching MIMO transmission modes based on the comparison of the MIMO channel quality indicator with the threshold.

3. The method of claim 2, wherein the threshold varies according to the first SNR measurement, and wherein comparing comprises comparing the MIMO channel quality indicator with the threshold that varies according to the first SNR measurement.

4. The method of claim 2, wherein when the MIMO channel quality indicator is greater than the threshold, switching comprises switching from the second MIMO transmission mode to the first MIMO transmission mode.

5. The method of claim 1, wherein computing the MIMO channel quality indicator based on a ratio comprises computing $$\left(\frac{SINRA}{SINRA} + \sqrt{\frac{SINRA^2}{SINRB^2} - 4}\right)/2,$$

wherein SINRA is the first SNR measurement and SINRB is the second SNR measurement.

6. The method of claim 1, and further comprising, at the first wireless communication device, storing data representing thresholds that are dependent on the first SNR measurement or the second SNR measurement, locating a position of a point with respect to decision regions defined by the thresholds, the point being derived from a difference between the first SNR measurement and the second SNR measurement, and the first SNR measurement or second SNR measurement, and determining whether to switch MIMO transmission modes based on the location of point relative to the decision regions.

7. The method of claim 6, wherein storing comprises storing data representing a first curve defining a floor threshold with respect to a first decision region where the MIMO transmission mode is to be switched from the second MIMO transmission mode to the first MIMO transmission mode, and a second curve defining a ceiling with respect to a second decision region where the MIMO transmission mode is to be switched from the first MIMO transmission mode to the second MIMO transmission mode, and wherein a third decision region is defined between the first curve and the second curve where the MIMO transmission mode is to be unchanged.

8. The method of claim 1, and further comprising updating a stored value representing the first SNR measurement or a stored value representing the second SNR measurement depending on whether an acknowledgment message is received from the second wireless communication device at the first wireless communication device in response to transmissions sent to the second wireless communication device while the first wireless communication device is sending transmissions in the first MIMO transmission mode or second MIMO transmission mode, respectively, and comparing the first SNR measurement or second SNR measurement after it is updated to determine whether to switch MIMO transmission modes.

9. The method of claim 1, and further comprising, based on signals received from the second wireless communication device and based on the first SINR measurement or second SINR measurement, computing one or more of an average correlation rate with respect to a correlation between downlink beamforming weight vectors used by the first wireless communication device when transmitting to the second wireless communication device, a channel rate based on power of signals received at the plurality of antennas of the first wireless communication device via multiple paths, and an effective SNR rate derived from power at subcarriers of received signals at the first wireless communication device, and wherein evaluating further comprises evaluating one or more of the average correlation rate, channel correlation rate and effective SNR rate with respect to corresponding thresholds to determine whether to switch MIMO transmission modes.

10. An apparatus comprising:
a plurality of antennas;
a receiver configured to be coupled to the plurality of antennas and to produce receive signals associated with received transmissions received at the plurality of antennas from a wireless communication client device;
a transmitter configured to be coupled to the plurality of antennas and to produce transmit signals to be transmitted via the plurality of antennas to the wireless communication device; and
a controller configured to be coupled to the receiver and to the transmitter, wherein the controller is configured to:
obtain from a received transmission from the wireless communication device a first signal-to-noise ratio (SNR) measurement made by the wireless communication device with respect to a first multiple-input multiple-output (MIMO) transmission mode using a space time code technique and a second SNR measurement made by the wireless communication device with respect to a second MIMO transmission mode using a spatial multiplexing technique;
compute a MIMO channel quality indicator based on a ratio of the first SNR measurement to the second SNR measurement; and
evaluate the MIMO channel quality indicator to determine whether to switch MIMO transmission modes for transmissions to the second wireless communication device.

11. The apparatus of claim 10, wherein the controller is configured to compare the MIMO channel quality indicator with a threshold, and to switch MIMO transmission modes based on the comparison of the MIMO channel quality indicator with the threshold.

12. The apparatus of claim 11, wherein the controller is configured to switch from the second MIMO transmission mode to the first MIMO transmission mode based on a comparison of the MIMO channel quality indicator with the threshold, wherein second MIMO transmission mode has a higher throughput than the first MIMO transmission mode.

13. The apparatus of claim 10, wherein the controller is configured to store data representing thresholds that are dependent on the first SNR measurement or the second SNR measurement, locate a position of a point with respect to decision regions defined by the thresholds, the point being derived from a difference between the first SNR measurement and the second SNR measurement, and the first SNR measurement or second SNR measurement, and to determine whether to switch MIMO transmission modes based on the location of point relative to the decision regions.

14. The apparatus of claim 10, wherein the controller is configured to update a stored value representing the first SNR measurement or a stored value representing the second SNR measurement depending on whether an acknowledgment message is received from the second wireless communication device at the first wireless communication device in response to transmissions sent to the second wireless communication device while the first wireless communication device is sending transmissions in the first MIMO transmission mode or second MIMO transmission mode, respectively, and compare the first SNR measurement or second SNR measurement after it is updated to determine whether to switch MIMO transmission modes.

15. A tangible non-transitory processor readable medium storing instructions, that when executed by a processor, cause the processor to:
at a first wireless communication device, obtain from one or more signals received from a second wireless communication device information representing a first signal-to-noise ratio (SNR) measurement made by the second wireless communication device with respect to a first multiple-input multiple-output (MIMO) transmission mode in which the first wireless communication device uses a space time code technique to transmit a signal stream via the plurality of antennas of the first wireless communication device to the second wireless communication device and a second SNR measurement made by the second wireless communication device with respect to a second MIMO transmission mode in which the first wireless communication device uses a spatial multiplexing technique to transmit multiple signal streams simultaneously via the plurality of antennas to the second wireless communication device, wherein the second MIMO transmission mode has a higher throughput than the first MIMO transmission mode;

compute a MIMO channel quality indicator based on a ratio of the first SNR measurement to the second SNR measurement; and evaluate the MIMO channel quality indicator to determine whether to switch MIMO transmission modes for transmissions to the second wireless communication device.

16. The tangible non-transitory processor readable medium of claim 15, wherein the instructions that cause the processor to evaluate comprise instructions that cause the processor to compare the MIMO channel quality indicator with a threshold, and switching MIMO transmission modes based on the comparison of the MIMO channel quality indicator with the threshold.

17. The tangible non-transitory processor readable medium of claim 15, wherein the instructions that cause the processor to compare comprise instructions that cause the processor to compare the MIMO channel quality indicator with a threshold that varies according to the first SNR measurement.

18. The tangible non-transitory processor readable medium of claim 15, and further comprising instructions that, when executed by the processor, cause the processor to store data representing thresholds that are dependent on the first SNR measurement or the second SNR measurement, locate a position of a point with respect to decision regions defined by the thresholds, the point being derived from the a difference between the SNR measurement and the second SNR measurement, and the first SNR measurement or second SNR measurement, and to determine whether to switch MIMO transmission modes based on the location of point relative to the decision regions.

19. The tangible non-transitory processor readable medium of claim 15, and further comprising instructions that, when executed by the processor, cause the processor to, based on signals received from the second wireless communication device and based on the first SINR measurement or second SINR measurement, compute one or more of an average correlation rate with respect to a correlation between downlink beamforming weight vectors used by the first wireless communication device when transmitting to the second wireless communication device, a channel rate based on power of signals received at the plurality of antennas of the first wireless communication device via multiple paths, and an effective SNR rate derived from power at subcarriers of received signals at the first wireless communication device, and wherein the instructions that cause the processor to evaluate comprise instructions that cause the processor to evaluate one or more of the average correlation rate, channel correlation rate and effective SNR rate with respect to corresponding thresholds to determine whether to switch MIMO transmission modes.

* * * * *